United States Patent
Koetter

(12) United States Patent (10) Patent No.: US 11,204,855 B2
Koetter (45) Date of Patent: Dec. 21, 2021

(54) IN-MEMORY DATABASE SERVICE TRACE MINING

(71) Applicant: SAP SE, Walldorf (DE)

(72) Inventor: Thomas Theodor Koetter, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/872,616

(22) Filed: May 12, 2020

(65) Prior Publication Data

US 2021/0357304 A1 Nov. 18, 2021

(51) Int. Cl.
*G06F 11/34* (2006.01)
*G06F 11/30* (2006.01)
*G06F 9/30* (2018.01)
*G06F 9/46* (2006.01)
*G06F 9/451* (2018.01)

(52) U.S. Cl.
CPC ........ *G06F 11/3476* (2013.01); *G06F 9/3009* (2013.01); *G06F 9/451* (2018.02); *G06F 9/466* (2013.01); *G06F 11/3006* (2013.01); *G06F 11/3075* (2013.01)

(58) Field of Classification Search
None
See application file for complete search history.

(56) References Cited

U.S. PATENT DOCUMENTS

| | | | |
|---|---|---|---|
| 7,653,651 B1* | 1/2010 | Pavlov | G06F 16/2343 707/999.103 |
| 2011/0320878 A1* | 12/2011 | Rosu | G06F 11/302 714/38.1 |
| 2016/0328169 A1* | 11/2016 | Hassan | G06F 3/0625 |
| 2018/0024754 A1* | 1/2018 | Hassan | G06F 12/109 711/170 |
| 2018/0136913 A1* | 5/2018 | Mayer | G06F 8/71 |
| 2018/0137010 A1* | 5/2018 | Mayer | G06F 11/1451 |
| 2018/0137145 A1* | 5/2018 | Mayer | G06F 16/25 |
| 2018/0137146 A1* | 5/2018 | Mayer | G06F 16/2455 |
| 2019/0266275 A1* | 8/2019 | Wernze | G06F 16/24539 |
| 2019/0303270 A1* | 10/2019 | Hoermann | G06F 11/3644 |

* cited by examiner

*Primary Examiner* — Qing Chen
(74) *Attorney, Agent, or Firm* — Schwegman Lundberg & Woessner, P.A.

(57) ABSTRACT

In an example embodiment, a solution is provided to mine trace data, detangle it, and rewrite the trace data without redundancy. In an example embodiment, mining may take place before detangling, but such an ordering is not mandatory. Combining mining with detangling solves the technical problem of the production of difficult-to-read service traces, as it mines the "interesting" parts, corrects the timestamp order, and removes redundancy.

20 Claims, 9 Drawing Sheets

FIG. 4

```
[61042][329414][89/-1] 2018-10-01 05:57:18.649148 e Memory      ReportMemoryProblems.cpp(01785) : 3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
[16186][329414][89/-1] 2018-10-01 05:57:18.649354 e Memory      ReportMemoryProblems.cpp(01785) : 3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
[61042][329414][89/-1] 2018-10-01 05:57:18.649148 e Memory      ReportMemoryProblems.cpp(01785) : 4: 0x00007fb9d504fc4e in
MemoryManager::MemoryPool::allocate(unsigned long, ltt::allocator_statistics&, bool&, bool, void const*)+0x22a at MemoryPool.cpp:1074 (libhdbbasis.so)
[40857][329414][89/-1] 2018-10-01 05:57:18.649747 e Memory      ReportMemoryProblems.cpp(01785) : 3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
4: 0x00007fb9d504fc4e in MemoryManager::MemoryPool::allocate(unsigned long, ltt::allocator_statistics&, bool&, bool, void const*)+0x22a at
MemoryPool.cpp:1074 (libhdbbasis.so)
[40844][329414][89/-1] 2018-10-01 05:57:18.649799 e Memory      ReportMemoryProblems.cpp(01785) : 3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
[41371][329414][89/-1] 2018-10-01 05:57:18.650370 e Memory      ReportMemoryProblems.cpp(01785) : 1: 0x00007fb9d50de32e in
MemoryManager::LimitInfo::incrementLimitRelevantUsage(unsigned long)+0x1a at AllocatorStatistics.cpp:463 (libhdbbasis.so)
[40844][329414][89/-1] 2018-10-01 05:57:18.649799 e Memory      ReportMemoryProblems.cpp(01785) : 4: 0x00007fb9d504fc4e in
MemoryManager::MemoryPool::allocate(unsigned long, ltt::allocator_statistics&, bool&, bool, void const*)+0x22a at MemoryPool.cpp:1074 (libhdbbasis.so)
[41371][329414][89/-1] 2018-10-01 05:57:18.650370 e Memory      ReportMemoryProblems.cpp(01785) : 2: 0x00007fb9d50de3cd in
ltt::allocator_statistics::incrementSecondaryCompositeLimitRelevantUsage(unsigned long)+0x19 at AllocatorStatistics.cpp:1549 (libhdbbasis.so)
[40835][329414][89/-1] 2018-10-01 05:57:18.649655 e Memory      ReportMemoryProblems.cpp(01785) : 3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
[44964][329414][89/-1] 2018-10-01 05:57:18.649625 e Memory      ReportMemoryProblems.cpp(01785) : 3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
[41371][329414][89/-1] 2018-10-01 05:57:18.650370 e Memory      ReportMemoryProblems.cpp(01785) : 3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
4: 0x00007fb9d504fc4e in MemoryManager::MemoryPool::allocate(unsigned long, ltt::allocator_statistics&, bool&, bool, void const*)+0x22a at
MemoryPool.cpp:1074 (libhdbbasis.so)
[40835][329414][89/-1] 2018-10-01 05:57:18.649655 e Memory      ReportMemoryProblems.cpp(01785) : 4: 0x00007fb9d504fc4e in
MemoryManager::MemoryPool::allocate(unsigned long, ltt::allocator_statistics&, bool&, bool, void const*)+0x22a at MemoryPool.cpp:1074 (libhdbbasis.so)
[61042][329414][89/-1] 2018-10-01 05:57:18.649148 e Memory      ReportMemoryProblems.cpp(01785) : 5: 0x00007fb9d500f08 in
MemoryManager::PoolAllocator::allocateNoThrowImpl(unsigned long, void const*)+0x84 at PoolAllocator.cpp:1634 (libhdbbasis.so)
```

FIG. 6

```
[61042](329414)[89/-1] 2018-10-01 05:57:18.649148 e Memory        ReportMemoryProblems.cpp(01785) :    3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
     4: 0x00007fb9d504fc4e in MemoryManager::MemoryPool::allocate(unsigned long, unsigned short, ltt::allocator_statistics&, bool&,
bool, void const*)+0x22a at MemoryPool.cpp:1074 (libhdbbasis.so)
     5: 0x00007fb9d5000f08 in MemoryManager::PoolAllocator::allocateNoThrowImpl(unsigned long, unsigned long, void const*)+0x84 at
PoolAllocator.cpp:1634 (libhdbbasis.so)
[16186](329414)[89/-1] 2018-10-01 05:57:18.649354 e Memory        ReportMemoryProblems.cpp(01785) :    3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
     4: 0x00007fb9d504fc4e in MemoryManager::MemoryPool::allocate(unsigned long, unsigned short, ltt::allocator_statistics&, bool&,
bool, void const*)+0x22a at MemoryPool.cpp:1074 (libhdbbasis.so)
     5: 0x00007fb9d5000f08 in MemoryManager::PoolAllocator::allocateNoThrowImpl(unsigned long, unsigned long, void const*)+0x84 at
PoolAllocator.cpp:1634 (libhdbbasis.so)
[44964](329414)[89/-1] 2018-10-01 05:57:18.649625 e Memory        ReportMemoryProblems.cpp(01785) :    3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
[40835](329414)[89/-1] 2018-10-01 05:57:18.649655 e Memory        ReportMemoryProblems.cpp(01785) :    3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
     4: 0x00007fb9d504fc4e in MemoryManager::MemoryPool::allocate(unsigned long, unsigned short, ltt::allocator_statistics&, bool&,
bool, void const*)+0x22a at MemoryPool.cpp:1074 (libhdbbasis.so)
     5: 0x00007fb9d5000f08 in MemoryManager::PoolAllocator::allocateNoThrowImpl(unsigned long, unsigned long, void const*)+0x84 at
PoolAllocator.cpp:1634 (libhdbbasis.so)
[40857](329414)[89/-1] 2018-10-01 05:57:18.649747 e Memory        ReportMemoryProblems.cpp(01785) :    3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
     4: 0x00007fb9d504fc4e in MemoryManager::MemoryPool::allocate(unsigned long, unsigned short, ltt::allocator_statistics&, bool&,
bool, void const*)+0x22a at MemoryPool.cpp:1074 (libhdbbasis.so)
     5: 0x00007fb9d5000f08 in MemoryManager::PoolAllocator::allocateNoThrowImpl(unsigned long, unsigned long, void const*)+0x84 at
PoolAllocator.cpp:1634 (libhdbbasis.so)
[40844](329414)[89/-1] 2018-10-01 05:57:18.649799 e Memory        ReportMemoryProblems.cpp(01785) :    3: 0x00007fb9d50b9cdb in
MemoryManager::LimitRelevantUsageScope::incrementUsage(unsigned long)+0xc7 at LimitRelevantUsageScope.hpp:133 (libhdbbasis.so)
     4: 0x00007fb9d504fc4e in MemoryManager::MemoryPool::allocate(unsigned long, unsigned short, ltt::allocator_statistics&, bool&,
bool, void const*)+0x22a at MemoryPool.cpp:1074 (libhdbbasis.so)
     5: 0x00007fb9d5000f08 in MemoryManager::PoolAllocator::allocateNoThrowImpl(unsigned long, unsigned long, void const*)+0x84 at
PoolAllocator.cpp:1634 (libhdbbasis.so)
[41371](329414)[89/-1] 2018-10-01 05:57:18.650370 e Memory        ReportMemoryProblems.cpp(01785) :    1: 0x00007fb9d50de3e in
MemoryManager::LimitInfo::incrementLimitRelevantUsage(unsigned long)+0x1da at AllocatorStatistics.cpp:463 (libhdbbasis.so)
     2: 0x00007fb9d50de3cd in ltt::allocator_statistics::incrementSecondaryCompositeLimitRelevantUsage(unsigned long)+0x19 at
AllocatorStatistics.cpp:1549 (libhdbbasis.so)
     3: 0x00007fb9d50b9cdb in MemoryManager::LimitRelevantUsageScope::incrementUsage(unsigned long)+0xc7 at
LimitRelevantUsageScope.hpp:133 (libhdbbasis.so)
     4: 0x00007fb9d504fc4e in MemoryManager::MemoryPool::allocate(unsigned long, unsigned short, ltt::allocator_statistics&, bool&,
bool, void const*)+0x22a at MemoryPool.cpp:1074 (libhdbbasis.so)
```

FIG. 7

IN-MEMORY DATABASE SERVICE TRACE MINING

TECHNICAL FIELD

This document generally relates to in-memory database technology. More specifically, this document relates to a service trace mining of an in-memory database.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example of in-memory database is the HANA® database from SAP SE, of Walldorf, Germany.

BRIEF DESCRIPTION OF DRAWINGS

The present disclosure is illustrated by way of example and not limitation in the figures of the accompanying drawings, in which like references indicate similar elements.

FIG. 4 is a screen capture of one screen of a graphical user interface, in accordance with an example embodiment.

FIG. 6 is a screen capture of text of a trace file, in accordance with an example embodiment.

FIG. 7 is a screen capture of text of an output file, in accordance with an example embodiment.

DETAILED DESCRIPTION

Figure 1:
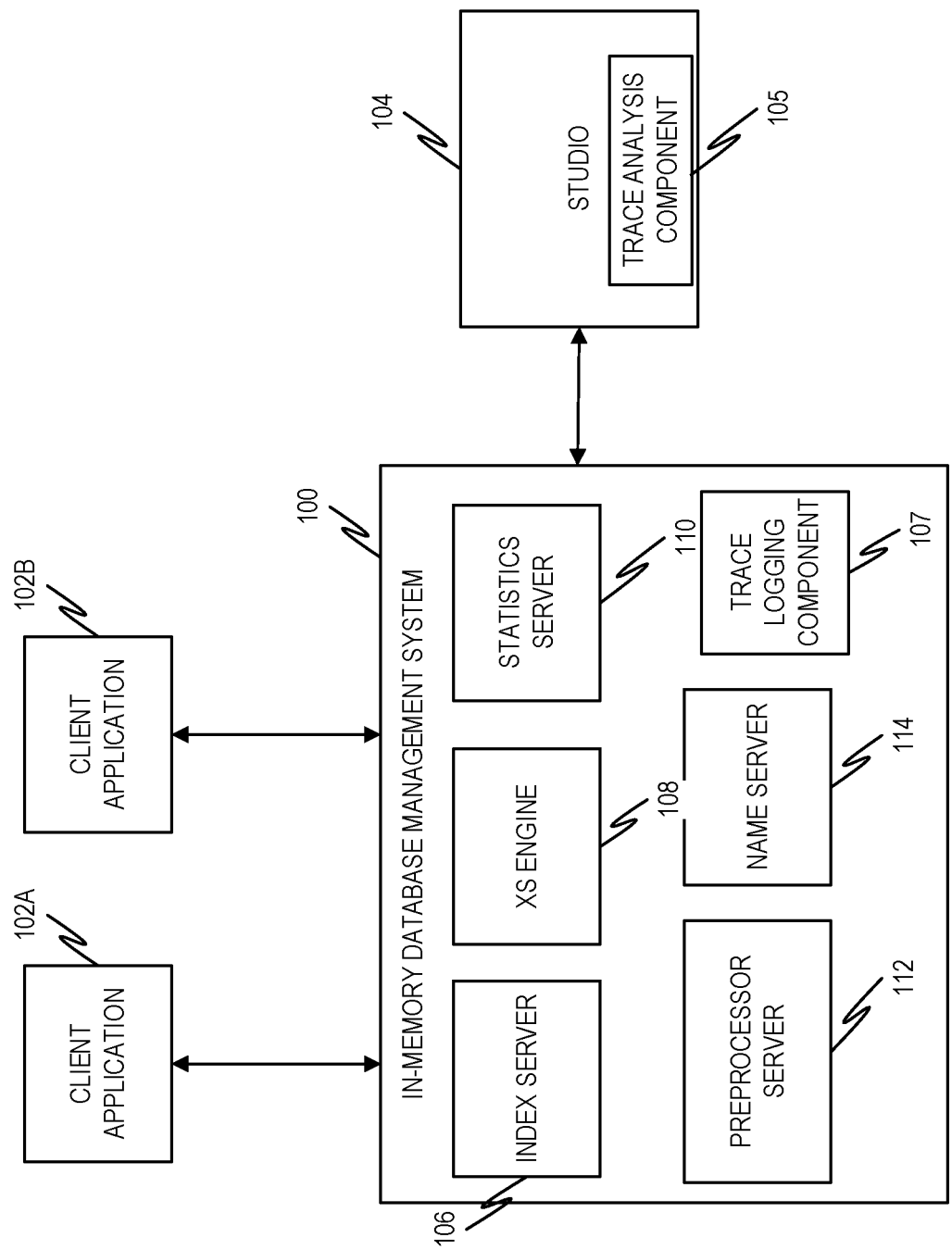
FIG. 1 is a diagram illustrating an in-memory database management system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

An entity that establishes an in-memory database may be provided with a series of tools that allow the entity to troubleshoot problems with the in-memory database, such as problems with individual components in the in-memory database. One such set of tools are service trace tools. Trace tools enable internal database commands/results of executions of commands to be logged for later analysis. Specifically, for example, if a database trace is configured, the traces for the trace components of the system, such as the index server and the name server, are written to one or more files. A software program may then be used to aid an administrator in analyzing the logged commands/executions. For example, HANA® service traces are often read with editors or extracted using mining tools like "grep." The combination of logged commands and execution of commands (e.g., successful execution or an error code) may be collectively referred to as "items."

A specific technical problem, however, is encountered in the case of in-memory database traces. Specifically, since in-memory database items are highly parallel, trace lines of different trace context may be mixed in an order that is not foreseeable. Specifically, for each logging event, a trace header line is written into the log file(s) having general information about the item(s) in the event, such as thread identification, connection identification, and so forth, and then one or more lines of the actual items may be written. Since the execution in an in-memory database is so parallelized, items that are executing as part of a single execution may be interleaved with items from other threads/connections/and the like, causing multiple items that would otherwise have been grouped under a single trace header line to be separated and each have their own trace header line. This is known as being "tangled." In other words, if the trace lines of a particular trace context cannot be written in a single chunk, then the trace header information is repeated in order to identify the context, and this repeated trace header information is spaced throughout the trace file(s). Not only does this make it difficult to group related items for troubleshooting purposes, it also adds redundant lines to the trace file(s). Additionally, timestamps for the items are not strictly ordered, so that the sequence of operation in the trace file can be misleading, especially if the timestamps differ only in microseconds.

The existing software programs for reading and interpreting trace data have no specific information on trace data file structure, so their analysis features are neither complete nor structured. These problems are exacerbated as more load is placed on the in-memory database instance and higher trace levels are set. What is needed is a solution that avoids these technical problems.

In an example embodiment, a solution is provided to mine trace data, detangle it, and rewrite the trace data without redundancy. In an example embodiment, mining may take place before detangling, but such an ordering is not mandatory. Combining mining with detangling solves the technical problem of the production of difficult-to-read service traces, as it mines the "interesting" parts, corrects the timestamp order, and removes redundancy.

FIG. 1 is a diagram illustrating an in-memory database management system 100, including its client/external connection points, which can be kept stable in the case of disaster recovery to ensure stable service operations, in accordance with an example embodiment. Here, the in-memory database management system 100 may be coupled to one or more client applications 102A, 102B. The client applications 102A, 102B may communicate with the in-memory database management system 100 through a number of different protocols, including Structured Query Language (SQL), Multidimensional Expressions (MDX), Hypertext Transfer Protocol (HTTP), REST, and Hypertext Markup Language (HTML).

Also depicted is a studio 104, used to perform modeling or basic database access and operations management by accessing the in-memory database management system 100. The studio may include a trace analysis component 105 utilized to request tracing be performed by the in-memory database management system 100 and analyze trace logs. As will be described in more detail below, this trace analysis component 105 may, in an example embodiment, be designed to perform mining and detangling operations on trace data stored in trace data files. The trace data files may be written to by a trace logging component 107 on the in-memory database management system 100. More particularly, the trace analysis component 105 may instruct the trace logging component 107 to log certain items executed by the in-memory database management system 100. This logging may include tracking a thread identification, connection identification, transaction identification, time stamp, trace level, component, and source file for groups (threads) of items, along with a copy of the items themselves, and then writing this information to one or more trace files.

The trace analysis component 105 may then to perform mining and detangling of the trace file(s). This mining and detangling process will be described in more detail below.

The in-memory database management system 100 may comprise a number of different components, including an index server 106, an XS engine 108, a statistics server 110, a preprocessor server 112, and a name server 114. These components may operate on a single computing device, or may be spread among multiple computing devices (e.g., separate servers).

The index server 106 contains the actual data and the engines for processing the data. It also coordinates and uses all the other servers.

The XS engine 108 allows clients to connect to the in-memory database management system 100 using web protocols, such as HTTP.

The statistics server 110 collects information about status, performance, and resource consumption from all the other server components. The statistics server 110 can be accessed from the studio 104 to obtain the status of various alert monitors.

The preprocessor server 112 is used for analyzing text data and extracting the information on which text search capabilities are based.

The name server 114 holds information about the database topology. This is used in a distributed system with instances of the database on different hosts. The name server 114 knows where the components are running and which data is located on which server.

Figure 2:
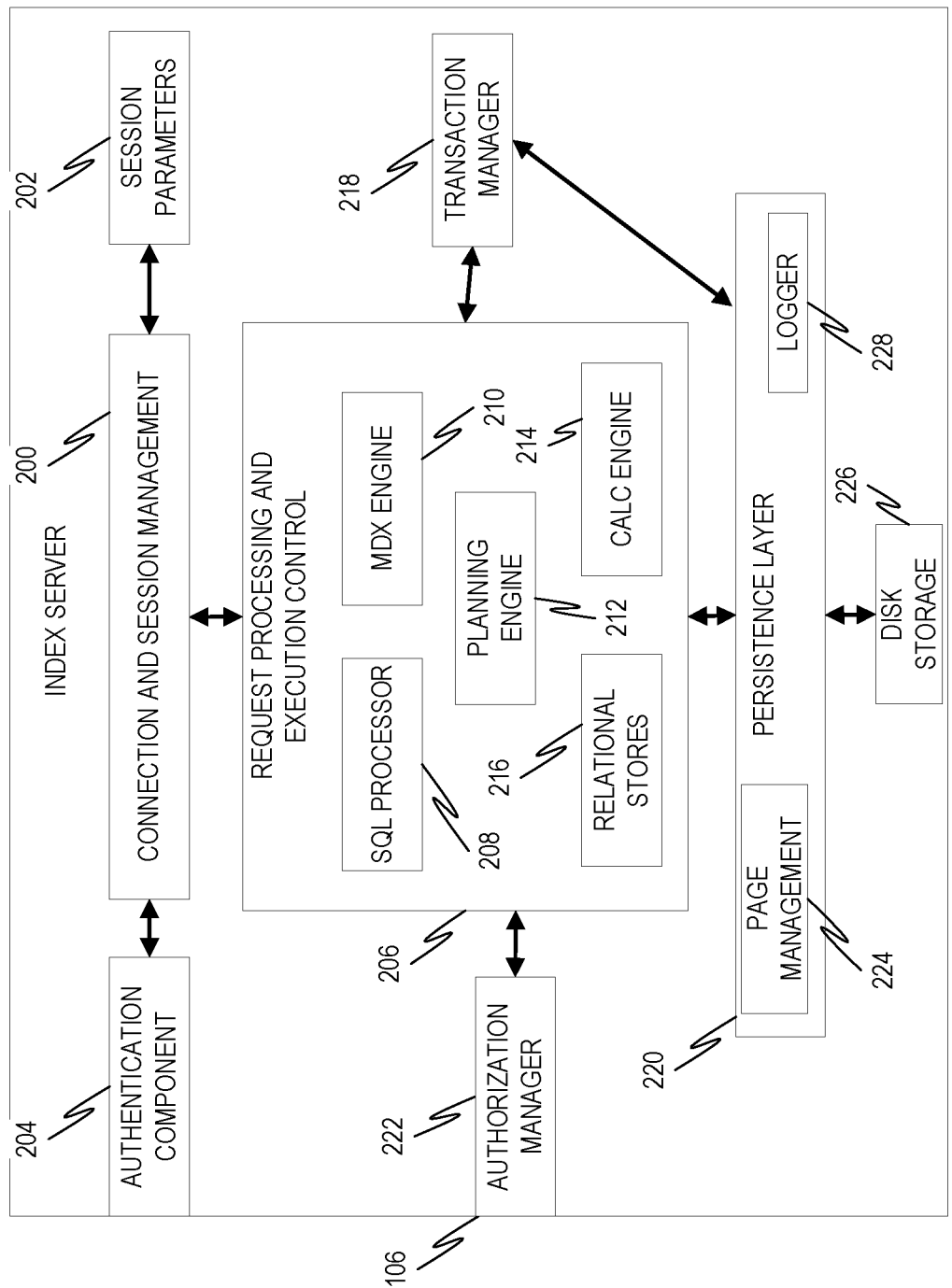
FIG. 2 is a diagram illustrating an index server, in accordance with an example embodiment.

FIG. 2 is a diagram illustrating an index server 106, in accordance with an example embodiment. Specifically, the index server 106 of FIG. 1 is depicted in more detail. The index server 106 includes a connection and session management component 200, which is responsible for creating and managing sessions and connections for the database clients. Once a session is established, clients can communicate with the database system using SQL statements. For each session, a set of session parameters 202 may be maintained, such as auto-commit, current transaction isolation level, and so forth. Users (e.g., system administrators, developers) may be authenticated by the database system itself (e.g., by logging in with user name and password, using an authentication component 204), or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. MDX is a language for querying and manipulating multidimensional data stored in online analytical processing (OLAP) cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL scripts, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database system components to check whether the user has the specified privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to and from a separate disk storage 226. The persistence layer 220 also contains a logger 228 that manages the transaction log. Log entries can be written implicitly by the persistence layer 220 when data is written via the persistence interface or explicitly by using a log interface. This logger 228 may also interface with the trace logging component 106 of FIG. 1, which may obtain its log information either partially or completely from the logger 228.

Figure 3:
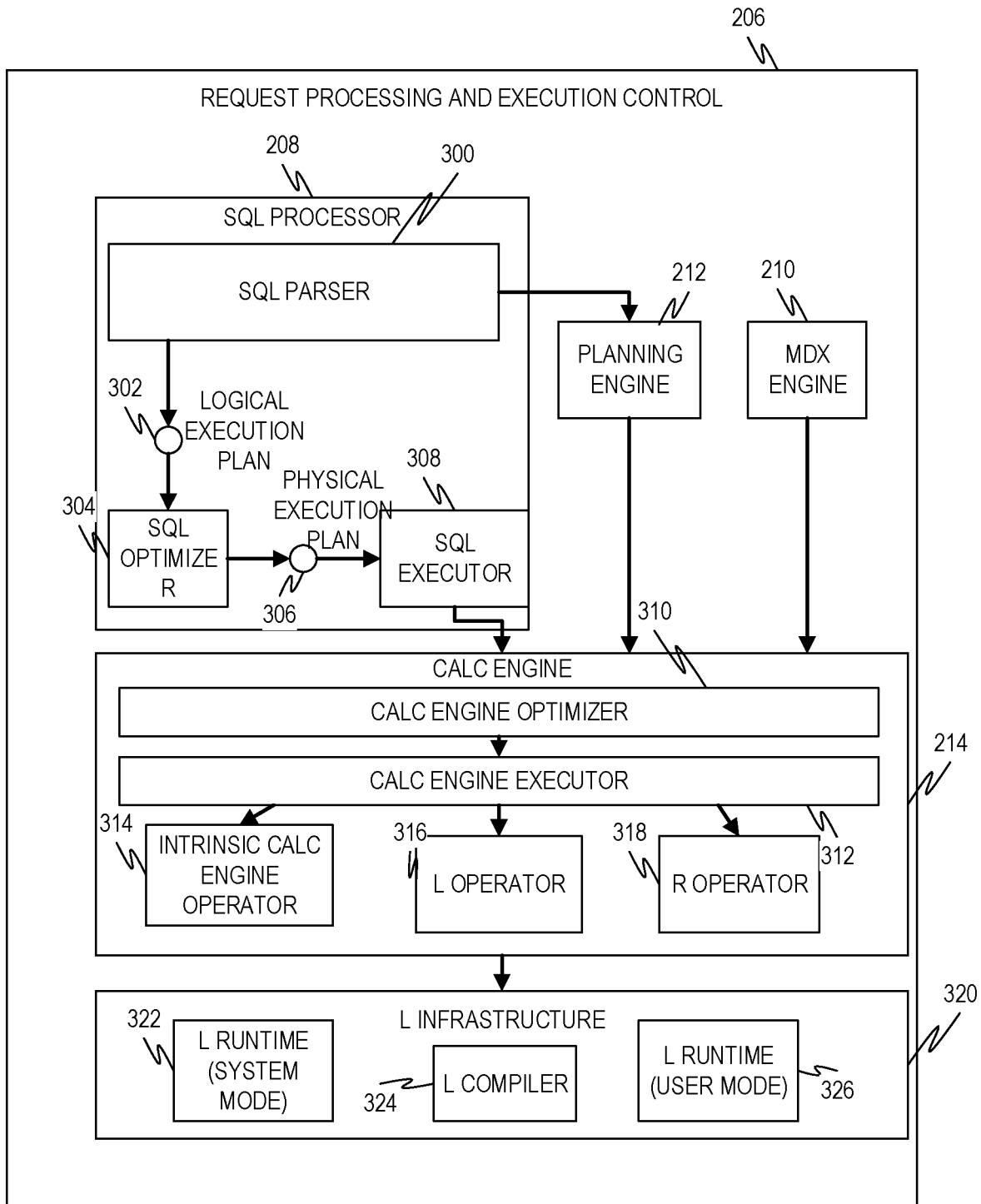
FIG. 3 is a diagram illustrating a request processing and execution control, in accordance with an example embodiment.

FIG. 3 is a diagram illustrating a request processing and execution control 206, in accordance with an example embodiment. This diagram depicts the request processing and execution control 206 of FIG. 2 in more detail. The SQL processor 208 contains an SQL parser 300, which parses an SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calc engine 214 implements the various SQL script and planning operations, and includes a calc engine optimizer 310, which optimizes the operations; a calc engine executor 312, which executes the operations; and an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (user mode) 326.

Figure 4:
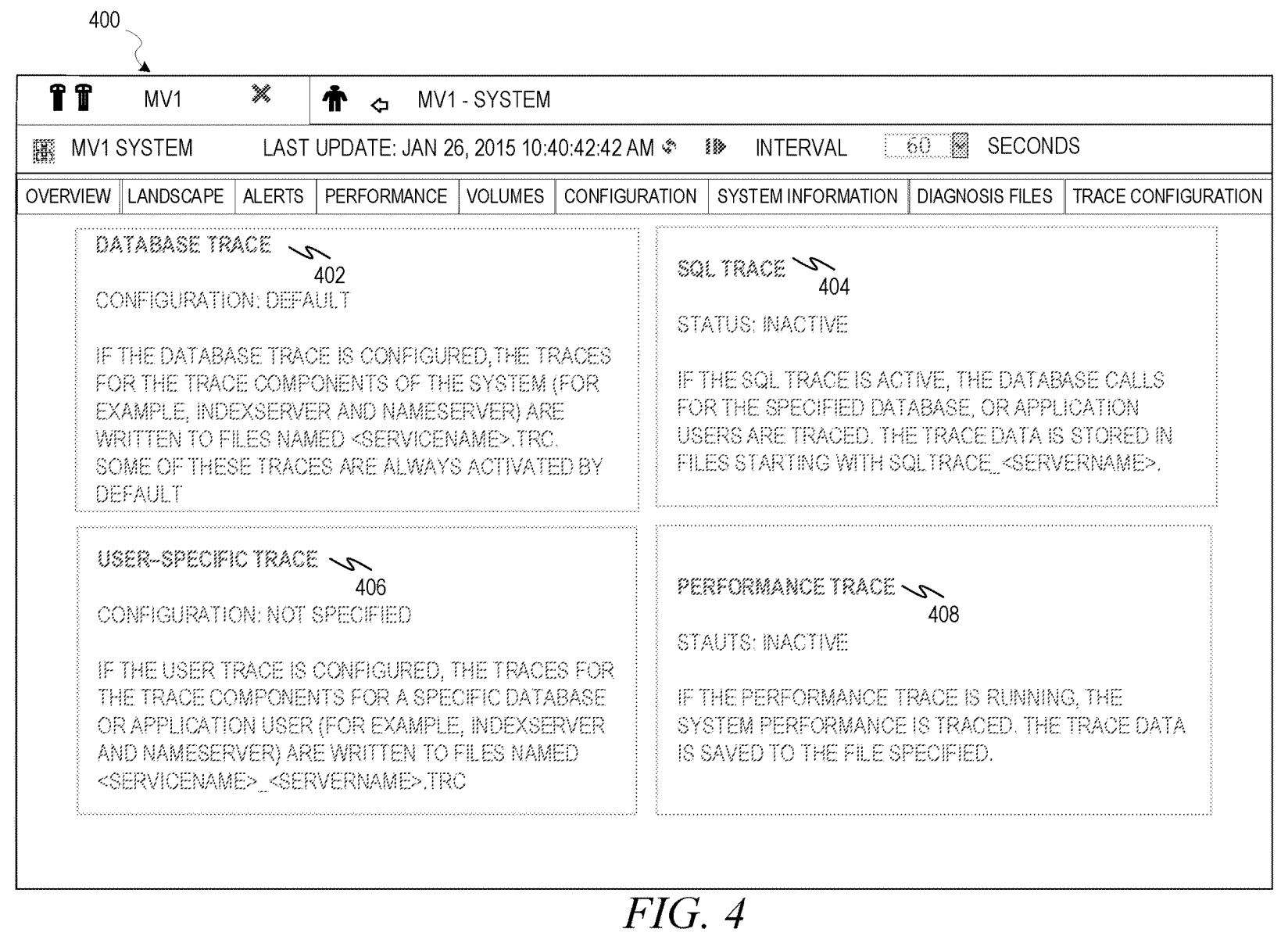

Referring back to FIG. 1, studio 104 may include a graphical user interface that allows a user, such as a database administrator, to invoke the trace analysis component 105. FIG. 4 is a screen capture of one screen 400 of the graphical user interface, in accordance with an example embodiment. Specifically, links to various types of traces, including a database trace 402, SQL trace 404, user-specific trace 406, and performance trace 408 may be included in the screen. Selection of, for example, the database trace 402 link causes traces for various components of the in-memory database management system 100, such as the index server 106 or name server 114, to be initiated. The trace files themselves, which are written to by the trace logging component 107, may be analyzed and viewed using a separate graphical user interface. Prior to the viewing, the trace logging component may perform mining and detangling operations on the trace file(s).

As described briefly earlier, the mining operation and the detangling operation are commutative, meaning that the ordering of the mining and the detangling does not change its result. Nevertheless, in an example embodiment, detangling is performed as a last step, as sorting on reduced volumes of service traces is faster than sorting on the larger volumes. Sorting demands $O(n \log(n))$ operations while mining is done in $O(n)$.

The mining operations may take as input one or more filters of items (or other items stored in the trace file(s)) of interest to the user/administrator. For example, the user/administrator may specify that all timestamps after 21:14 for components STATS_WORKER and STATS_CTRL, and where an error was logged, should be mined. This essentially has specified three filters. The first filter is all items with timestamp after 21:14. The second filter is items generated from component STATS_WORKER or STATS_CTRL, and the third filter is items containing an error indication.

In an example embodiment, a mining operation for each specified filter is performed on the trace file(s). For example, the mining operations for the above example may be:
1. mine trace for all timestamps after 21:14 and store result
   mine action: take all lines with (timestamp>21:14)
2. take result of 1 and mine trace for components STATS_WORKER or STATS_CTRL and store result
   mine action: take all lines with (component==STATS_WORKER OR component==STATS_CTRL)
3. take result of 2 and mine trace for level error and store result
   mine action: take all lines with (level==error)

It should be noted that the term "lines" as used in this disclosure shall be interpreted broadly to refer to any division between distinct elements of the trace file, and is not intended to be limited to merely particular rows of a displayed version of the trace file. For example, two "lines" of a trace file may be visually depicted, either partially or completely, as being on the same row of a display when displayed, but these are still considered to be separate lines if they are distinct trace headers and/or items in the trace file.

Filters may be specified by the user/administrator, either by typing them in via text in the graphical user interface or by utilizing one or more graphical user interface elements, such as drop-down lists or checkboxes. In an example embodiment, the ordering of the filters provided by the user/administrator is used to generate the mining operations. For example, if the user specified the timestamp-based filter first then the operation pertaining to the time-stamp based filter is performed first, and the other filter(s) are performed on the results of that first operation. In another example embodiment, the ordering of the filters may be altered to improve computing efficiency. Specifically, it is beneficial from a processing standpoint to perform the most restrictive filtering operation first, as that eliminates processing steps that would ordinarily be performed by less restrictive filtering operations. Thus, in an example embodiment, the filters provided by the user/administrator are reordered so that they are ranked from most restrictive to least restrictive prior to the operations from the filters being generated.

Once the filters have been obtained (and possibly reordered), a logical expression is generated from operations for each of the filters. For example, the above example filters cause the following logical expression to be generated (assuming no reordering of filters):
(timestamp>21:14)
   AND (component==STATS_WORKER OR component STATS_CTRL)
   AND (level==error)

In another example, a user/administrator may specify a first filter for thread identification equal to 4711, 1972, 0815, or 4165, a second filter for connection identification equal to 12345, 98765, or 44444, and a third filter for trace level of "info" or "error." Thus, this example may be:
1. mine trace for all threads 4711, 1972, 0815, 4165 and store result
   mine action: take each line with (thread==4711 OR thread==1972 OR thread==0815 OR thread==4165)
2. take result of 1 and mine trace for all connections 12345, 98765, 44444 and store result
   mine action: take each line with (connection==12345 OR connection 98765 OR connection==44444)
3. take result of 2 and mine trace for level info or error and store result
   mine action: take each line with (level==error OR level==info)
with the following logical expression generated:
(thread==4711 OR thread==1972 OR thread==0815 OR thread==4165)
AND (connection==12345 OR connection==98765 OR connection==44444)
AND (level==error OR level==info)

A negative operator may also be included, allowing a user/administrator to select a negative filter, such as ignoring items meeting a certain criterion. For example, the user/administrator may specify a first filter for thread identification equal to 4711, 1972, 0815, or 4165; a second filter for connection identification equal to 12345, 98765, or 44444; a third filter for trace level of "info" or "error"; and a fourth filter for ignoring items for component STATS_WORKER or STATS_CTRL. Thus, this example may be
1. mine trace for all threads 4711, 1972, 0815, 4165 and store result
   mine action: take each line with (thread==4711 OR thread==1972 OR thread==0815 OR thread==4165)
2. take result of 1 and mine trace for all connections 12345, 98765, 44444 and store result
   mine action: take each line with (connection==12345 OR connection 98765 OR connection==44444)
3. take result of 2 and mine trace for level info or error and store result mine action: take each line with (level==error OR level==info)
4. take result of 3. and ignore trace for component STATS_WORKER or STATS_CTRL
   mine action: omit each line with (component==STATS_WORKER OR component==STATS_CTRL)

This may result in the following logical expression:
(thread==4711 OR thread==1972 OR thread==0815 OR thread==4165)
AND (connection==12345 OR connection==98765 OR connection==44444)
AND (level==error OR level==info)
AND NOT (component==STATS_WORKER OR component==STATS_CTRL).

The result of applying the logical expression to the trace file(s) is a list of trace headers and items underneath the trace headers, in the order in which they were stored in the original trace file(s). As explained earlier, though, even this reduced trace header/item set may be difficult to understand as there are still related items that are separated from each other by other unrelated items (such as items in a different thread) and there are still redundant trace headers. In an example embodiment, a series of detangling operations are then performed. The first detangling operation is to sort the trace according to timestamp and thread identification. As a thread can only write one trace context at a given timestamp, it is sufficient to sort the headers/items using just the timestamps and thread identification.

Specifically, the list of trace headers and items is traversed and, for each unique combination of timestamp and thread identification, an object is created. The trace header is what will identify the timestamp and thread identification, and all items below that trace header, until reaching a subsequent trace header, are related to the trace header (there may be other items in the trace file that are also related to the same timestamp and thread identification, but these will be handled in a subsequent step after sorting; for purposes of this algorithm an item is deemed to be related to the last trace header above the item in the list). All trace headers and related items are then placed into the corresponding object, in the order they appear in the list of trace headers and items. This essentially groups a trace header and its immediately following items into an object, and does the same for every trace header in the list. Then a stable sort operation is performed on the objects, based on timestamp and thread identification. A stable sort operation is a sort operation in which objects with equal keys appear in the same order in the sorted output as they appear in the input. Some sorting algorithms are stable by nature, such as insertion sort, merge sort, and bubble sort, although any stable sorting algorithm may be used. This rearranges the objects so that objects having identical combinations of timestamp and thread identification are located adjacent to each other.

The sorted list of objects may then be traversed to remove redundant trace headers. Specifically, for each object, if the trace header for the object has the same combination of timestamp and thread identification as the immediately preceding object, then the trace header for the object is deleted and the object is merged with the immediately preceding object (specifically by concatenating the items of the object to the end of the last item in the immediately preceding object). Once this has been performed for all objects, the objects may be written to an output file. This output file contains the mined and detangled trace headers and items and also has eliminated the redundant trace headers. The result is an output file that is much easier to view and analyze.

Figure 5:
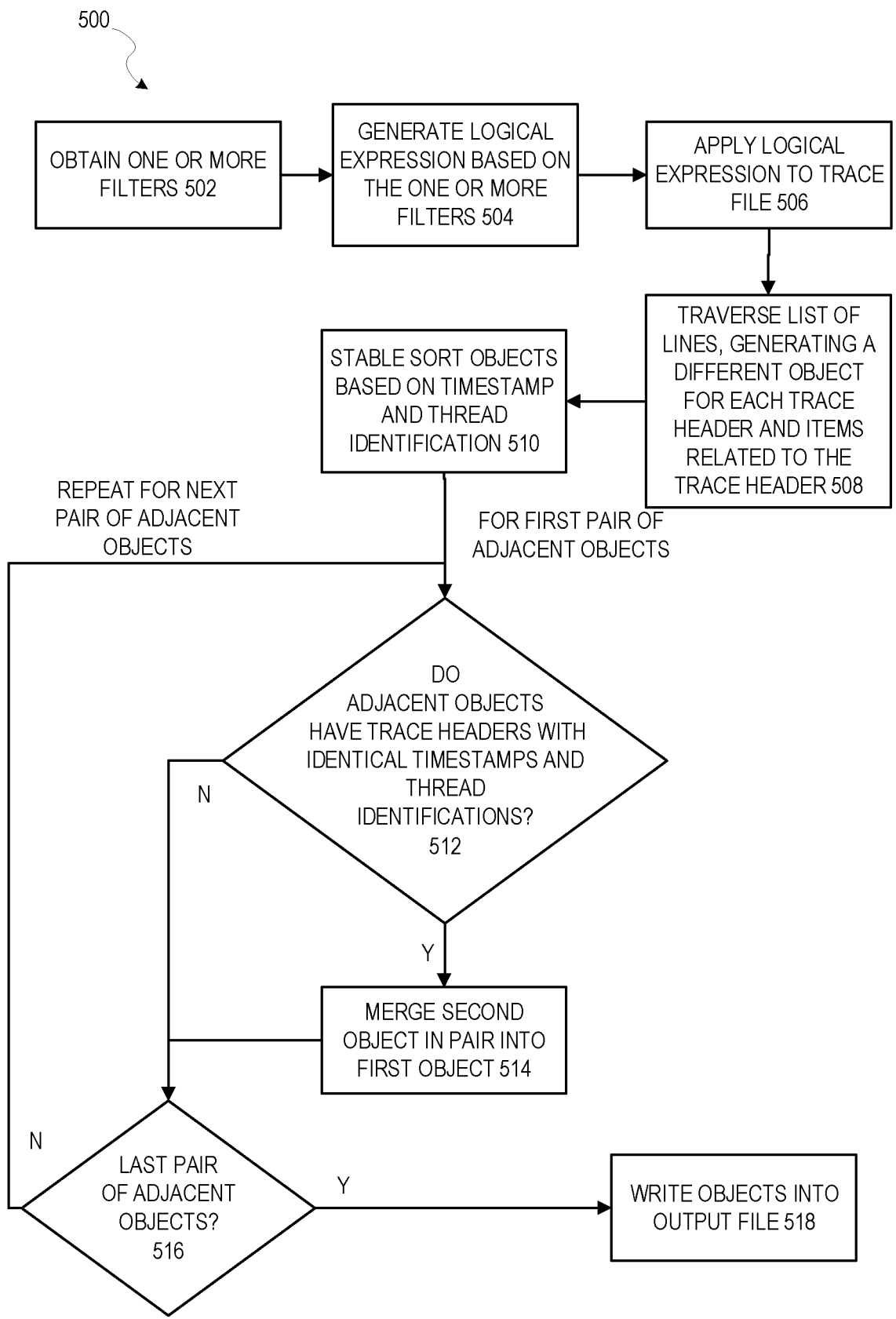
FIG. 5 is a flow diagram illustrating a method for creating an output file from a trace file of an in-memory database, in accordance with an example embodiment.

FIG. 5 is a flow diagram illustrating a method 500 for creating an output file from a trace file of an in-memory database, in accordance with an example embodiment. The trace file may contain trace headers and items, with each item related to a single trace header. Specifically, the trace file contains an ordered set of lines, with each line being either a trace header or an item. An item is deemed to be related to the last immediately preceding trace header in the trace file. A trace header may contain various pieces of information about the related trace files, including a thread identification indicating a thread in which the items were executed/obtained and a timestamp when the items were executed/obtained.

At operation 502, one or more filters may be obtained. In an example embodiment, these filters are obtained via a graphical user interface from a user/administrator. The one or more filters each specify some condition on searching for items in the trace file. At operation 504, a logical expression is generated based on the one or more filters. At operation 506, the logical expression is applied to the trace file to form a list of lines that satisfy the logical expression, in the same order the lines appeared in the trace file.

At operation 508, the list of lines is traversed, and for each trace header and items related to the trace header, a different object is generated, with each trace header and items related to the trace header placed in the corresponding object. At operation 510, the objects are stable sorted based on timestamp and thread identification of the corresponding trace headers inside the objects. The sorted objects are then traversed. For each pair of adjacent objects in the sorted objects, at operation 512, it is determined if the adjacent objects each contain trace headers having identical timestamps and thread identifications. It should be noted that this determination is not just made on original objects but also performed on recently merged objects. Thus, for example, if object o1 and o2 are adjacent and determined to be merged, then the combined object o1/o2 is now considered to be adjacent to object o3 that was originally adjacent to object o2. If so, then at operation 514, the second object in the pair is merged into the first object in the pair. The ordering of which object in a pair is first and which is second is identical to the order in which they appear in the sorted objects. Merging of the second object into the first object involves taking the items in the second object and concatenating them to the end of the items in the first object. This may involve ignoring the trace header in the second object when performing this concatenation, deleting the trace header in the second object, or any other mechanism to ensure that the trace header in the second object is not included in the merged first object, as that trace header is redundant with the trace header already contained in the first header. Once this has been done, or if at operation 514 it was determined that the adjacent objects each contain trace headers having identical timestamps and thread information, then at operation 516 it is determined if this is the last pair of adjacent objects. If not, then the process repeats to operation 512 for the next pair of adjacent objections. If so, then at operation 518 the objects are written to an output file.

FIG. 6 is a screen capture 600 of text of a trace file, in accordance with an example embodiment. This screen capture 600 reflects text that exists prior to the mining and detangling operations described in the present disclosure. Specifically, as can be seen, a number of trace headers 602A-602M appear in the trace file, with each trace header 602A-602M having a number of items beneath it until the next trace header 602A-602M is encountered. For example, trace header 602A has item 604A while trace header 602C has item 604B and trace header 602N has item 604C. Notably, trace header 602A, 602C, and 602M share the same timestamp and thread identification, meaning they all involve the same thread and were performed around the same time, but that is not evident from the trace file itself as they are interleaved with items from and with other trace headers.

FIG. 7 is a screen capture 700 of text of an output file, in accordance with an example embodiment. This output file contains trace header 602A, but notably trace header 602C and 604M have been removed, as they are redundant. Items under trace header 602C and 604M, such as item 604B, have been concatenated to the end of the item 604A. The result is an output file that is much easier to analyze and view.

EXAMPLES

Example 1

A system comprising:
at least one hardware processor; and
a computer-readable medium storing instructions that, when executed by the at least one hardware processor, cause the at least one hardware processor to perform operations comprising:
obtaining a list of lines contained in a trace file, each line being either a trace header or an item, each trace header corresponding to a particular combination of thread and timestamp of an execution by one or more components of one or more operations in an in-memory database, each line corresponding to a particular execution result of the one or more operations, each line being related to an immediately preceding last trace header in the trace file;
traversing the list of lines, in order, and for each trace header in the list of lines, generating a different object, and storing the trace header and lines related to the trace header in the corresponding object, producing an ordered set of objects;
sorting the ordered set of objects, producing a sorted ordered set of objects;
traversing the sorted ordered set of objects in order and, for each pair of a first and second object:
determining whether the first and second object share an identical thread identification and timestamp; and
in response to a determination that the first and second object share an identical thread identification and timestamp, merging the first and second objects by appending the items in the second object to the items in the first object without adding the header in the second object to the first object, and deleting the second object from the ordered set of objects; and
for all remaining objects in the sorted ordered set of objects, writing the header and items for each remaining object to an output file.

Example 2

The system of Example 1, wherein the operations further comprise:
obtaining one or more filters via a user interface;
generating a logical expression based on the one or more filters; and
wherein the obtaining includes obtaining only lines in the trace file that satisfy the logical expression.

Example 3

The system of Examples 1 or 2, wherein the operations further comprise:
obtaining one or more filters via a user interface; and
generating a logical expression based on the one or more filters;
filtering the remaining objects in the sorted ordered set of objects using the logical expression prior to the header and items for each remaining object being written to the output file.

Example 4

The system of any of Examples 1-3, wherein the sorting includes performing a stable sort.

Example 5

The system of Example 2, wherein the generating a logical expression includes, for each filter, creating a line of the logical expression, wherein each line after the first line applies a corresponding filter to output of the line above.

Example 6

The system of any of Examples 1-5, wherein each trace header further contains information regarding one or more parameters selected from connection identification, transaction identification, trace level, component, and source file.

Example 7

The system of Example 5, wherein the logical expression reorders the one or more filters in order of restrictiveness of the corresponding filters.

Example 8

A method comprising:
obtaining a list of lines contained in a trace file, each line being either a trace header or an item, each trace header corresponding to a particular combination of thread and timestamp of an execution by one or more components of one or more operations in an in-memory database, each line corresponding to a particular execution result of the one or more operations, each line being related to an immediately preceding last trace header in the trace file;
traversing the list of lines, in order, and for each trace header in the list of lines, generating a different object, and storing the trace header and lines related to the trace header in the corresponding object, producing an ordered set of objects;
sorting the ordered set of objects, producing a sorted ordered set of objects;
traversing the sorted ordered set of objects in order and, for each pair of a first and second object:
determining whether the first and second object share an identical thread identification and timestamp; and
in response to a determination that the first and second object share an identical thread identification and timestamp, merging the first and second objects by appending the items in the second object to the items in the first object without adding the header in the second object to the first object, and deleting the second object from the ordered set of objects; and for all remaining objects in the sorted ordered set of objects, writing the header and items for each remaining object to an output file.

Example 9

The method of Example 8, further comprising:
obtaining one or more filters via a user interface;
generating a logical expression based on the one or more filters; and
wherein the obtaining includes obtaining only lines in the trace file that satisfy the logical expression.

Example 10

The method of Examples 8 or 9, wherein the operations further comprise:
obtaining one or more filters via a user interface; and
generating a logical expression based on the one or more filters;
filtering the remaining objects in the sorted ordered set of objects using the logical expression prior to the header and items for each remaining object being written to the output file.

Example 11

The method of any of Examples 8-10, wherein the sorting includes performing a stable sort.

Example 12

The method of Example 9, wherein the generating a logical expression includes, for each filter, creating a line of the logical expression, wherein each line after the first line applies a corresponding filter to output of the line above.

Example 13

The method of any of Examples 8-12, wherein each trace header further contains information regarding one or more parameters selected from connection identification, transaction identification, trace level, component, and source file.

Example 14

The system of Example 12, wherein the logical expression reorders the one or more filters in order of restrictiveness of the corresponding filters.

Example 15

A non-transitory machine-readable medium storing instructions which, when executed by one or more processors, cause the one or more processors to perform operations comprising:
obtaining a list of lines contained in a trace file, each line being either a trace header or an item, each trace header corresponding to a particular combination of thread and timestamp of an execution by one or more components of one or more operations in an in-memory database, each line corresponding to a particular execution result of the one or more operations, each line being related to an immediately preceding last trace header in the trace file;
traversing the list of lines, in order, and for each trace header in the list of lines, generating a different object, and storing the trace header and lines related to the trace header in the corresponding object, producing an ordered set of objects;
sorting the ordered set of objects, producing a sorted ordered set of objects;
traversing the sorted ordered set of objects in order and, for each pair of a first and second object:
determining whether the first and second object share an identical thread identification and timestamp; and
in response to a determination that the first and second object share an identical thread identification and timestamp, merging the first and second objects by appending the items in the second object to the items in the first object without adding the header in the second object to the first object, and deleting the second object from the ordered set of objects; and
for all remaining objects in the sorted ordered set of objects, writing the header and items for each remaining object to an output file.

Example 16

The non-transitory machine-readable medium of Example 15, further comprising:
obtaining one or more filters via a user interface;
generating a logical expression based on the one or more filters; and
wherein the obtaining includes obtaining only lines in the trace file that satisfy the logical expression.

Example 17

The non-transitory machine-readable medium of Examples 16 or 17, wherein the operations further comprise:
obtaining one or more filters via a user interface; and
generating a logical expression based on the one or more filters;
filtering the remaining objects in the sorted ordered set of objects using the logical expression prior to the header and items for each remaining object being written to the output file.

Example 18

The non-transitory machine-readable medium of any of Examples 15-17, wherein the sorting includes performing a stable sort.

Example 19

The non-transitory machine-readable medium of Example 16, wherein the generating a logical expression includes, for each filter, creating a line of the logical expression, wherein each line after the first line applies a corresponding filter to output of the line above.

Example 20

The non-transitory machine-readable medium of any of Examples 15-19, wherein each trace header further contains information regarding one or more parameters selected from connection identification, transaction identification, trace level, component, and source file.

Figure 8:
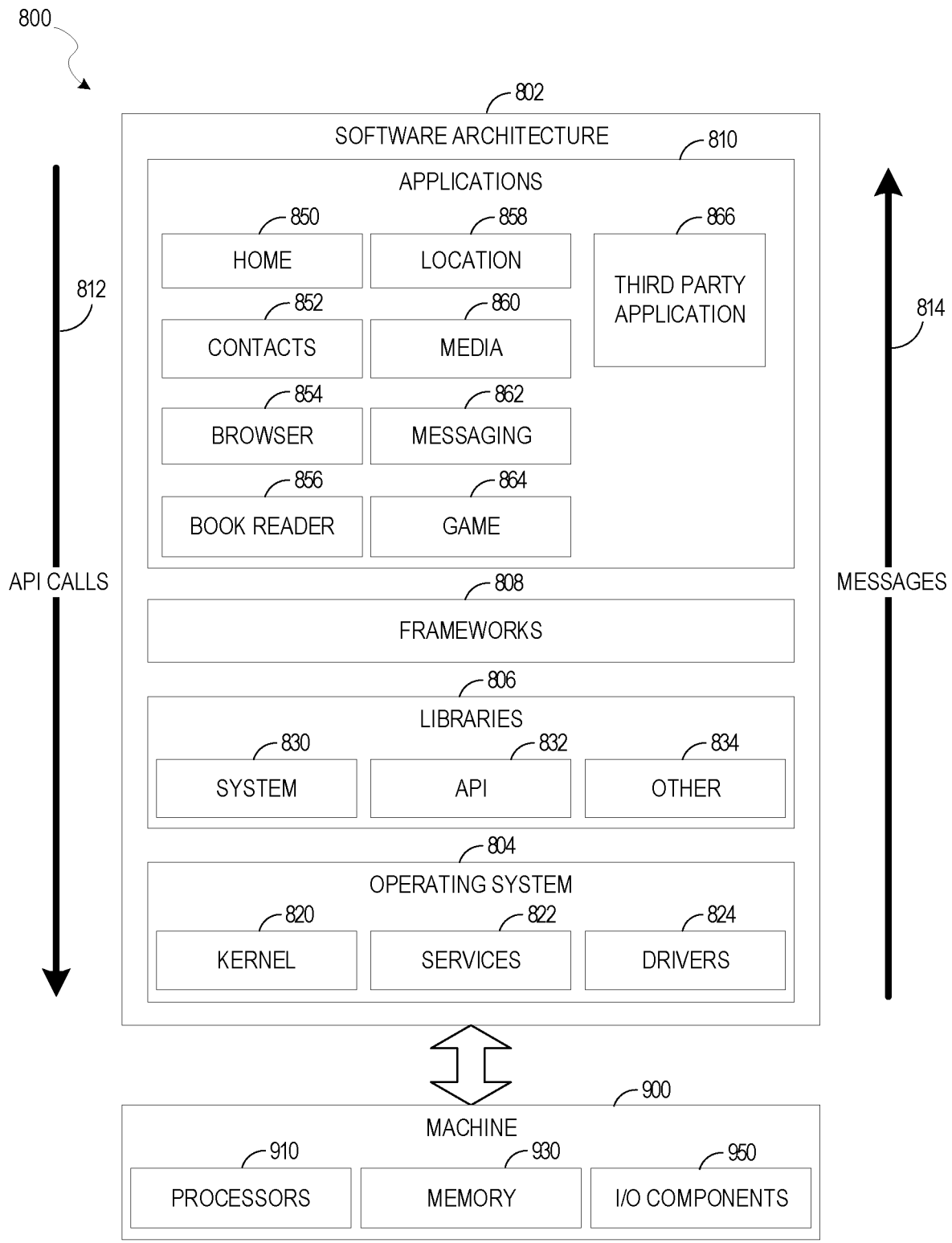
FIG. 8 is a block diagram illustrating an architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as third-party applications 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
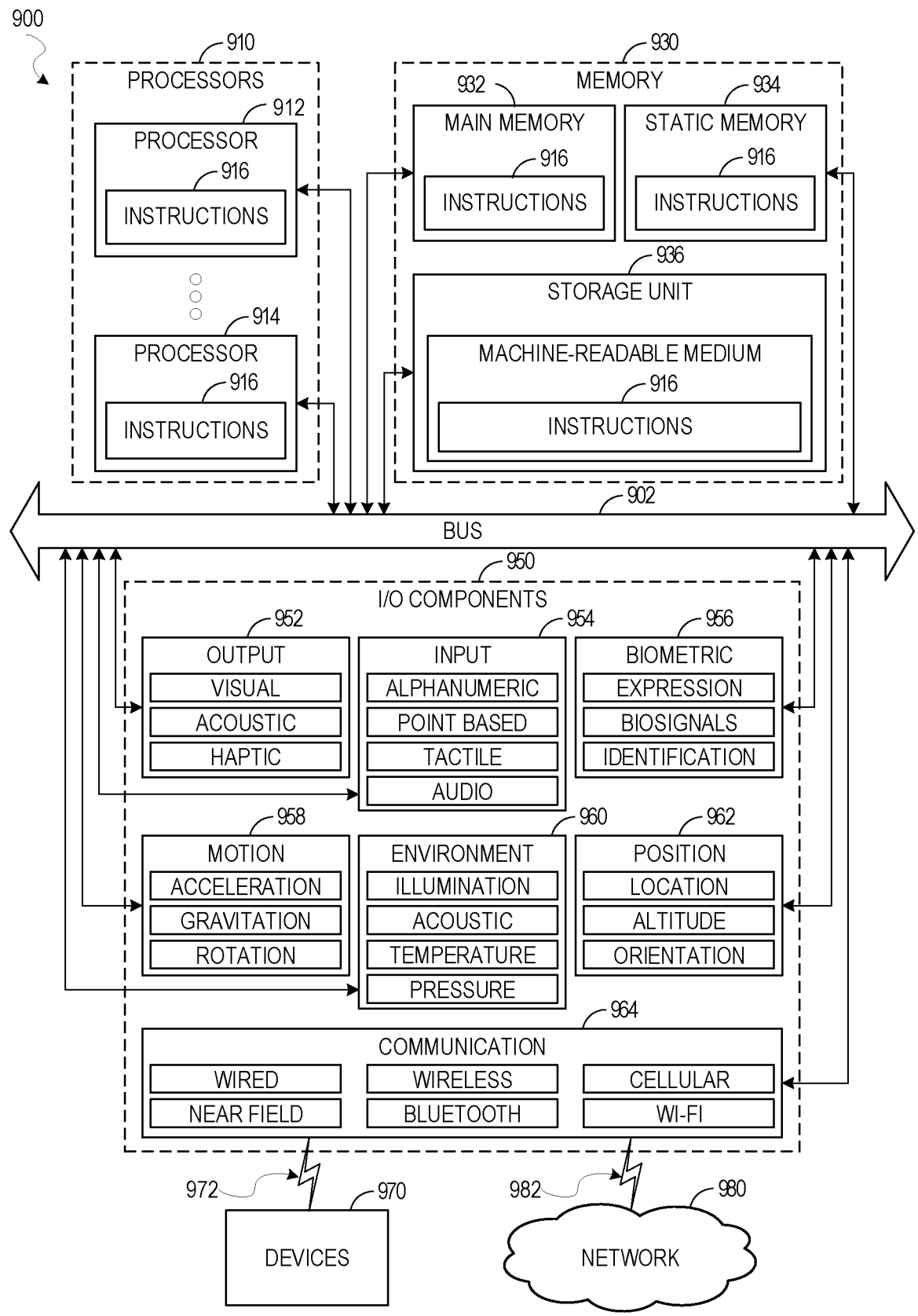
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods of FIG. 5. Additionally, or alternatively, the instructions 916 may implement FIGS. 1-6 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium"

mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
      obtaining a list of lines contained in a trace file, each line being either a trace header or an item, each trace header corresponding to a particular combination of thread and timestamp of an execution by one or more components of one or more operations in an in-memory database, each line corresponding to a particular execution result of the one or more operations, and each line being related to an immediately preceding last trace header in the trace file;
      traversing the list of lines contained in the trace file, in order, and for each trace header in the list of lines contained in the trace file, generating a different object, and storing the trace header and lines, in the list of lines contained in the trace file, related to the trace header in a corresponding object, producing an ordered set of objects;
      sorting the ordered set of objects, producing a sorted ordered set of objects;
      traversing the sorted ordered set of objects in order and, for each pair of a first object and a second object:
         determining whether the first object and the second object share an identical thread identification and timestamp; and
         in response to a determination that the first object and the second object share an identical thread identification and timestamp, merging the first and second objects by appending items in the second object to items in the first object without adding a trace header in the second object to the first object, and deleting the second object from the ordered set of objects; and
      for all remaining objects in the sorted ordered set of objects, writing a trace header and items for each remaining object to an output file.

2. The system of claim 1, wherein the operations further comprise:
   obtaining one or more filters via a user interface;
   generating a logical expression based on the one or more filters; and
   wherein the obtaining includes obtaining only lines in the trace file that satisfy the logical expression.

3. The system of claim 2, wherein the generating a logical expression includes, for each filter of the one or more filters, creating a line of the logical expression, and wherein each line after a first line of the logical expression applies a corresponding filter to output of a line above of the logical expression.

4. The system of claim 3, wherein the logical expression reorders the one or more filters in order of restrictiveness of corresponding filters.

5. The system of claim 1, wherein the operations further comprise:
obtaining one or more filters via a user interface;
generating a logical expression based on the one or more filters; and
filtering the remaining objects in the sorted ordered set of objects using the logical expression prior to the trace header and the items for each remaining object being written to the output file.

6. The system of claim 1, wherein the sorting includes performing a stable sort.

7. The system of claim 1, wherein each trace header further contains information regarding one or more parameters selected from connection identification, transaction identification, trace level, component, and source file.

8. A method comprising:
obtaining a list of lines contained in a trace file, each line being either a trace header or an item, each trace header corresponding to a particular combination of thread and timestamp of an execution by one or more components of one or more operations in an in-memory database, each line corresponding to a particular execution result of the one or more operations, and each line being related to an immediately preceding last trace header in the trace file;
traversing the list of lines contained in the trace file, in order, and for each trace header in the list of lines contained in the trace file, generating a different object, and storing the trace header and lines, in the list of lines contained in the trace file, related to the trace header in a corresponding object, producing an ordered set of objects;
sorting the ordered set of objects, producing a sorted ordered set of objects;
traversing the sorted ordered set of objects in order and, for each pair of a first object and a second object:
determining whether the first object and the second object share an identical thread identification and timestamp; and
in response to a determination that the first object and the second object share an identical thread identification and timestamp, merging the first and second objects by appending items in the second object to items in the first object without adding a trace header in the second object to the first object, and deleting the second object from the ordered set of objects; and
for all remaining objects in the sorted ordered set of objects, writing a trace header and items for each remaining object to an output file.

9. The method of claim 8, further comprising:
obtaining one or more filters via a user interface;
generating a logical expression based on the one or more filters; and
wherein the obtaining includes obtaining only lines in the trace file that satisfy the logical expression.

10. The method of claim 9, wherein the generating a logical expression includes, for each filter of the one or more filters, creating a line of the logical expression, and wherein each line after a first line of the logical expression applies a corresponding filter to output of a line above of the logical expression.

11. The method of claim 10, wherein the logical expression reorders the one or more filters in order of restrictiveness of corresponding filters.

12. The method of claim 8, further comprising:
obtaining one or more filters via a user interface;
generating a logical expression based on the one or more filters; and
filtering the remaining objects in the sorted ordered set of objects using the logical expression prior to the trace header and the items for each remaining object being written to the output file.

13. The method of claim 8, wherein the sorting includes performing a stable sort.

14. The method of claim 8, wherein each trace header further contains information regarding one or more parameters selected from connection identification, transaction identification, trace level, component, and source file.

15. A non-transitory machine-readable medium storing instructions which, when executed by one or more processors, cause the one or more processors to perform operations comprising:
obtaining a list of lines contained in a trace file, each line being either a trace header or an item, each trace header corresponding to a particular combination of thread and timestamp of an execution by one or more components of one or more operations in an in-memory database, each line corresponding to a particular execution result of the one or more operations, and each line being related to an immediately preceding last trace header in the trace file;
traversing the list of lines contained in the trace file, in order, and for each trace header in the list of lines contained in the trace file, generating a different object, and storing the trace header and lines, in the list of lines contained in the trace file, related to the trace header in a corresponding object, producing an ordered set of objects;
sorting the ordered set of objects, producing a sorted ordered set of objects;
traversing the sorted ordered set of objects in order and, for each pair of a first object and a second object:
determining whether the first object and the second object share an identical thread identification and timestamp; and
in response to a determination that the first object and the second object share an identical thread identification and timestamp, merging the first and second objects by appending items in the second object to items in the first object without adding a trace header in the second object to the first object, and deleting the second object from the ordered set of objects; and
for all remaining objects in the sorted ordered set of objects, writing a trace header and items for each remaining object to an output file.

16. The non-transitory machine-readable medium of claim 15, wherein the operations further comprise:
obtaining one or more filters via a user interface;
generating a logical expression based on the one or more filters; and
wherein the obtaining includes obtaining only lines in the trace file that satisfy the logical expression.

17. The non-transitory machine-readable medium of claim 16, wherein the operations further comprise:
obtaining one or more filters via a user interface;
generating a logical expression based on the one or more filters; and
filtering the remaining objects in the sorted ordered set of objects using the logical expression prior to the trace header and the items for each remaining object being written to the output file.

18. The non-transitory machine-readable medium of claim 16, wherein the generating a logical expression includes, for each filter of the one or more filters, creating a line of the logical expression, and wherein each line after a first line of the logical expression applies a corresponding filter to output of a line above of the logical expression.

19. The non-transitory machine-readable medium of claim 15, wherein the sorting includes performing a stable sort.

20. The non-transitory machine-readable medium of claim 15, wherein each trace header further contains information regarding one or more parameters selected from connection identification, transaction identification, trace level, component, and source file.

* * * * *